US008529113B2

(12) United States Patent
Brown et al.

(10) Patent No.: US 8,529,113 B2
(45) Date of Patent: Sep. 10, 2013

(54) THIN EDGE-LIT LED BACKLIGHT PANEL AND LIGHT GUIDE

(76) Inventors: Richard Brown, Vancouver, WA (US); John Wyss, Woodinville, WA (US)

( * ) Notice: Subject to any disclaimer, the term of this patent is extended or adjusted under 35 U.S.C. 154(b) by 248 days.

(21) Appl. No.: 13/204,233

(22) Filed: Aug. 5, 2011

(65) Prior Publication Data

US 2013/0033895 A1    Feb. 7, 2013

(51) Int. Cl.
*F21V 7/22*    (2006.01)
(52) U.S. Cl.
USPC .......................... 362/606; 362/603; 362/612
(58) Field of Classification Search
USPC .......................... 362/603, 606, 612
See application file for complete search history.

(56) References Cited

U.S. PATENT DOCUMENTS

| 6,805,468 B2* | 10/2004 | Itoh et al. | 362/362 |
| 7,677,783 B2* | 3/2010 | Wei et al. | 362/612 |
| 8,210,730 B2* | 7/2012 | Kurata et al. | 362/606 |

* cited by examiner

*Primary Examiner* — Stephen F Husar
*Assistant Examiner* — James Cranson, Jr.
(74) *Attorney, Agent, or Firm* — Seattle Patent Group LLC; James Haugan

(57) ABSTRACT

A backlight sufficiently bright to be useful as a backlight for a high definition LCD television panel, or other types of visual display screens is disclosed. An LED wide enough to provide adequate light energy is used. The light energy is directed into a thin substrate panel via a tapered aperture port, and released toward a viewing surface in a uniform manner due to light guide disrupters calculated to optimize the output pattern.

19 Claims, 4 Drawing Sheets

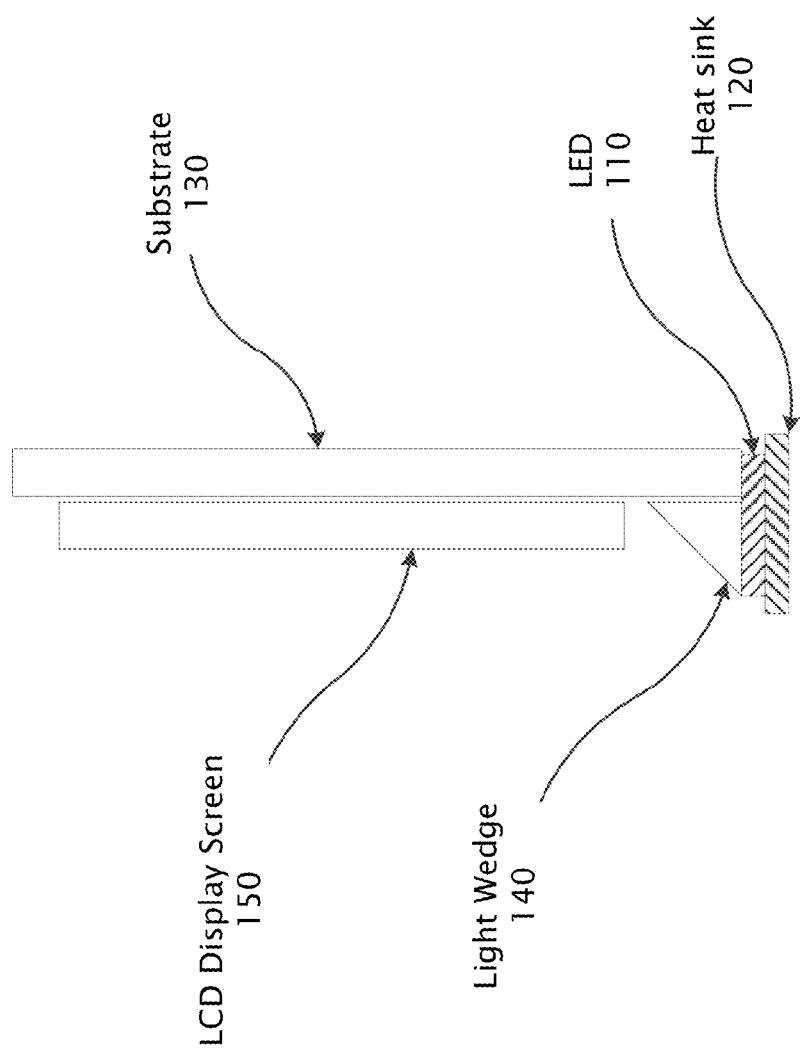

THIN EDGE-LIT LED BACKLIGHT PANEL AND LIGHT GUIDE

FIELD

This disclosure relates to techniques of lighting display screens, and, in particular, to backlights.

BACKGROUND

Backlights are light guide panels generally constructed of an optically clear substrate and are designed to guide light to exit the screen-facing side. The substrate may have a reflective backing, or may have indents to disperse the light. They are typically illuminated by placement of at least one LED along the outer perimeter of the backlight. Often two to four LED light bars of multiple LED's affixed to a solid heat sink strip are used to illuminate the backlight. Backlight material is generally an optically clear substrate, usually a light, transparent, thermoplastic. Backlights for HD LCD TVs are often made from approximately 8 mm thick rectangular sheets of optically clear thermoplastic. The view size of the backlight generally approximates the LCD display screen which it illuminates. To provide sufficient and uniform light energy penetration throughout an LCD display screen, adjacent to the backlight and between the backlight and the LCD display screen are diffusing layers that allow the light to pass into the LCD display screen in an even and uniform white light. Diffusing layers vary in number, usually between two and four layers depending on the spacing between the LEDs on the LED light bar and the output luminance rating of the backlight. LED light bars are often mounted on narrow strips of aluminum against the backlight edge, approximately 3-10 mm wide in LCD television displays, and use low power surface mount LED packages (such as smd 0603 or smd 3020 LEDs) mounted adjacent to one another such that their spacing is roughly 10 mm or greater along the light bar lengthwise. The light bar runs the length of the backlight's viewing opening. In addition to the LED backlight panels light output requirements (typically 1200 to 2000 lux for larger backlights), there are heat dissipation issues to be considered in order to promote long term LED reliability (typically rated at 50,000+ hours if run at 70% of maximum brightness and maintained at or below their normal operating temperatures). To address these heat buildup issues, these small and narrow LED bars are usually attached to a heat sink assembly which is usually quite large in comparison to the LED strips (about 22 mm to 35 mm and designed at various angles to promote efficient heat dissipation). This typical design result in a rather expensive, heavy, and thick backlight assembly, typically 12 mm to 24 mm in total thickness. The overall thickness of the standard television assembly including the LCD display screen in use in the industry is typically 15 mm to 30 mm in total.

SUMMARY OF THE INVENTION

The instant application discloses, among other things, techniques to light a display screen with a backlight using LEDs along one edge of the backlight. In one embodiment, this is done by a light wedge, allowing LEDs wider than the thickness of an optically clear substrate to be used. In another embodiment, several rows of LEDs may be used to lighten a substrate.

In at least one embodiment, a substrate may have light guide disrupters etched or otherwise embedded into a rear surface, a reflective film connected to the rear surface, or other such light guide disrupters to light a display more evenly. The location, size, and depth of such shapes, or a design on the reflective coating may be calculated by the use of an image of the substrate when it is lit without such light guide disrupters, and determining appropriate information to optimize homogeneity of the light output. With a proper design, diffusing layers may be thin or completely unnecessary. In another embodiment, ultraviolet LEDs may be used to activate a photo luminescent or fluorescent coating on the substrate, which may provide a brighter backlight than a reflective film.

BRIEF DESCRIPTION OF THE DRAWINGS

FIG. 1 is an example of a thin front-lit backlight for a LCD display screen.

DESCRIPTION OF THE INVENTION

FIG. 1 is an example of one embodiment of a thin front-lit backlight for a LCD display screen. In this embodiment, at least one LED 110 on a heat sink 120 is positioned at an input region of a substrate 130 in contact with a light wedge 140. Light wedge 140 contacts substrate 130 at the input region, and guides the LED 110 light emission from the wider input into the thinner layer of substrate 130. The forward-set light wedge 140 at the edge of the substrate 130 provides a recessed area for the LCD display screen 150 when mounted upon the backlight. Thickness is reduced in the example shown of a combined LCD display screen 150 and the substrate 130 thickness, since as it fits together a recessed area for the LCD display screen to rest is provided, due to the frontally positioned wedge 140 along the edge of the substrate 130. In some embodiments, substrate 130 thickness may be reduced to 3 mm or less. The edge-lit design where an LCD display screen 150 is recessed within the aperture-enhancing wedge, against the substrate area, produces a thinner combination of the panel and backlight due to the recessed LCD screen, and enhances the appearance and the aesthetics of high definition LCD television. It is anticipated that various shapes and designs of wide aperture input ports for the Thin Edge-Lit LED Backlight Panel are obvious. The basic function of all such designs is to increase the area of the LED light input aperture, and the example shown is via a thermoplastic light wedge 140 affixed to the front backlight edge, accepting all the output of the light bar, and providing a means to wedge the light into the narrower profile of the backlight thermoplastic substrate 130 of 3 mm thickness or less.

Figure 2A:
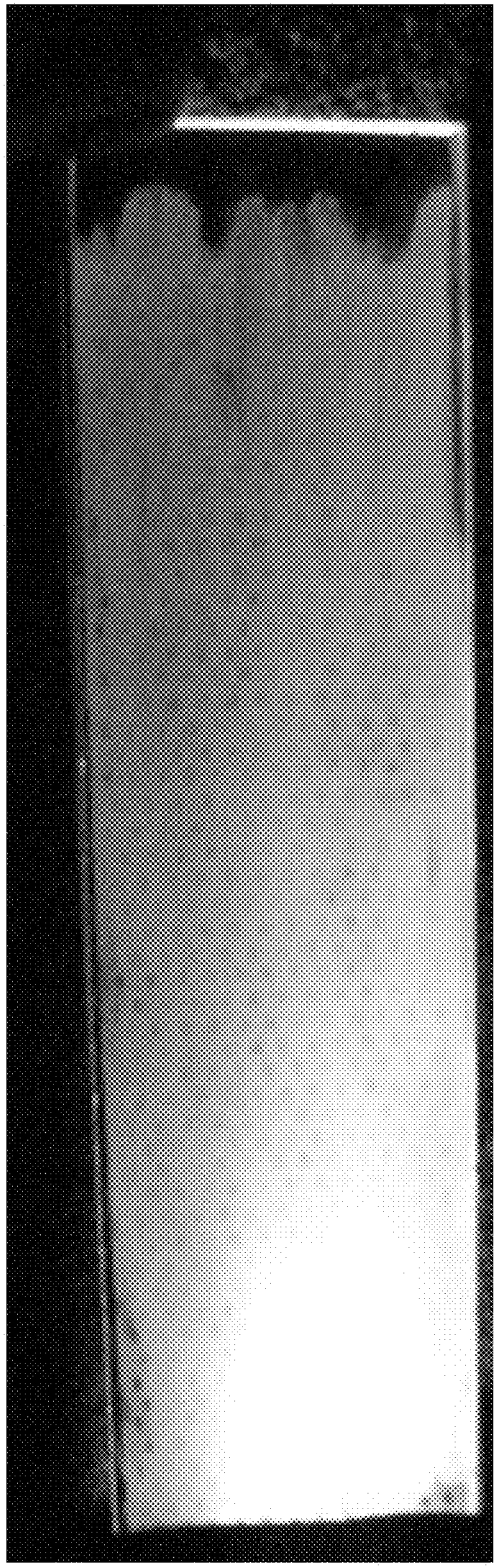
FIG. 2a is a photographic image of a substrate lit on one edge by a series of LEDs.

FIG. 2a is a photograph of an example of a substrate lit on one edge by a series of LEDs. This illustrates that a light shining into a substrate may have an uneven lighting effect. In this example, the area directly in front of the LEDs is bright, with the brightness reduced off-center from the LEDs as well as farther away from the LEDs toward the opposite edge of the substrate. Using a photograph or scan such as this may provide information to calculate an appropriate adjustment to allow the substrate to provide a more uniform light distribution. Adjusting the substrate may involve applying a reflective backing, for example, a white, silver, transparent, or translucent plastic sheet, with patterns of a darker color to reduce the light emitted from areas that are brighter than desired; applying paint or ink directly to the surface of the substrate, or by etching or drilling indents into the substrate to disrupt the light flow and guide light through the screen-side opening. A custom-made template may be created which may allow application of a reflective coating, or other light guide disrupters, to be applied to a series of similar substrates to provide a uniform or other desired light pattern.

In one embodiment, several layers of reflective coatings may be applied. In another embodiment, the substrate may comprise multiple layers of material based on a template calculated to provide a uniform or other desired light pattern.

One skilled in the art will recognize that there may be many other ways of adjusting the substrate to guide light to exit in the desired pattern.

Figure 2B:
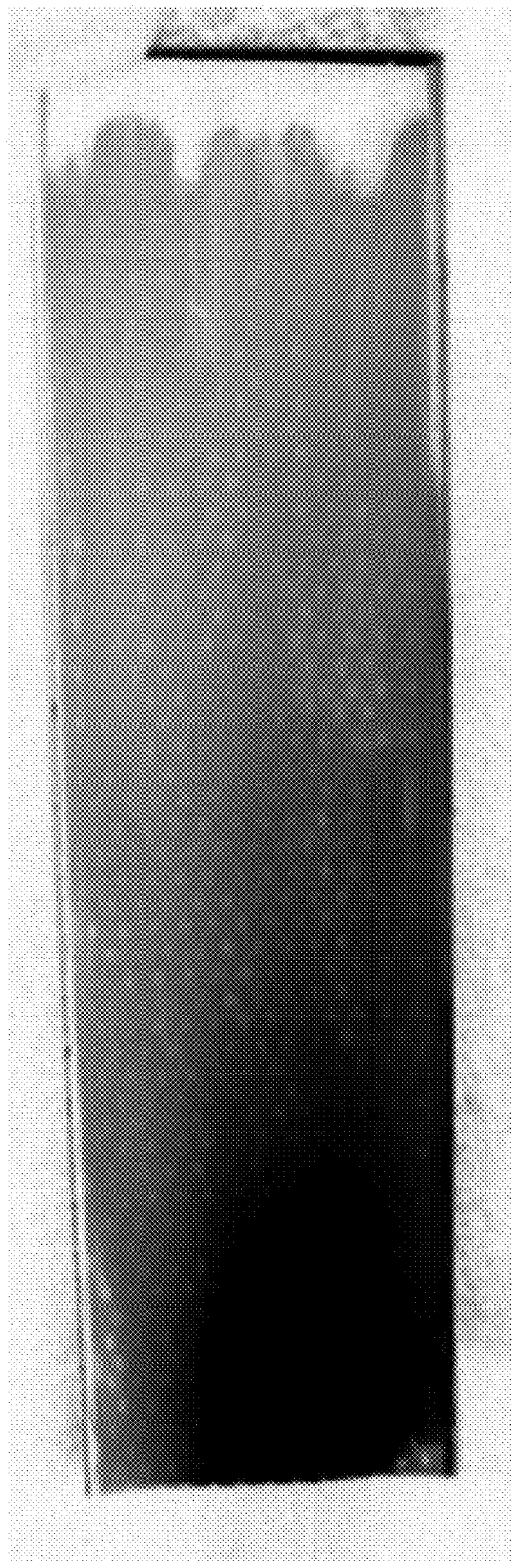
FIG. 2b is a negative image of a substrate lit on one edge by a series of LEDs.

FIG. 2b is a negative image of FIG. 2a. Using a negative such as this may allow a determination of the appropriate pattern to apply to a substrate to provide a uniform light output on a side facing a screen.

According to one embodiment, the shape, size, color, and location of reflective shapes or indented areas may be calculated by analyzing the light distribution emitting from the substrate without a reflective surface. Locations with more light being emitted would have fewer light guide disrupters, while areas with weaker light emission would have more or larger light guide disrupters.

The negative image of FIG. 2b may indicate one possible pattern for light disrupters. A reflective layer on the substrate may range from translucent to opaque, in a reverse image of the natural backlight image cast by the LED 110. A pattern for the reflective layer is designed to provide even light from points well-lit by the LED light source to the points not as well-lit by the light source, thus guiding the light to a generally uniform exit from the substrate.

One skilled in the art will realize that numerous designs in refractive and reflective surfaces may be adapted to even out the light being provided by the backlight. To maximize the back plate's light emission, special materials containing photo luminescent or phosphorescent chemicals may also be used, which may reduce the light output requirements on the LED light bar assembly.

Figure 3:
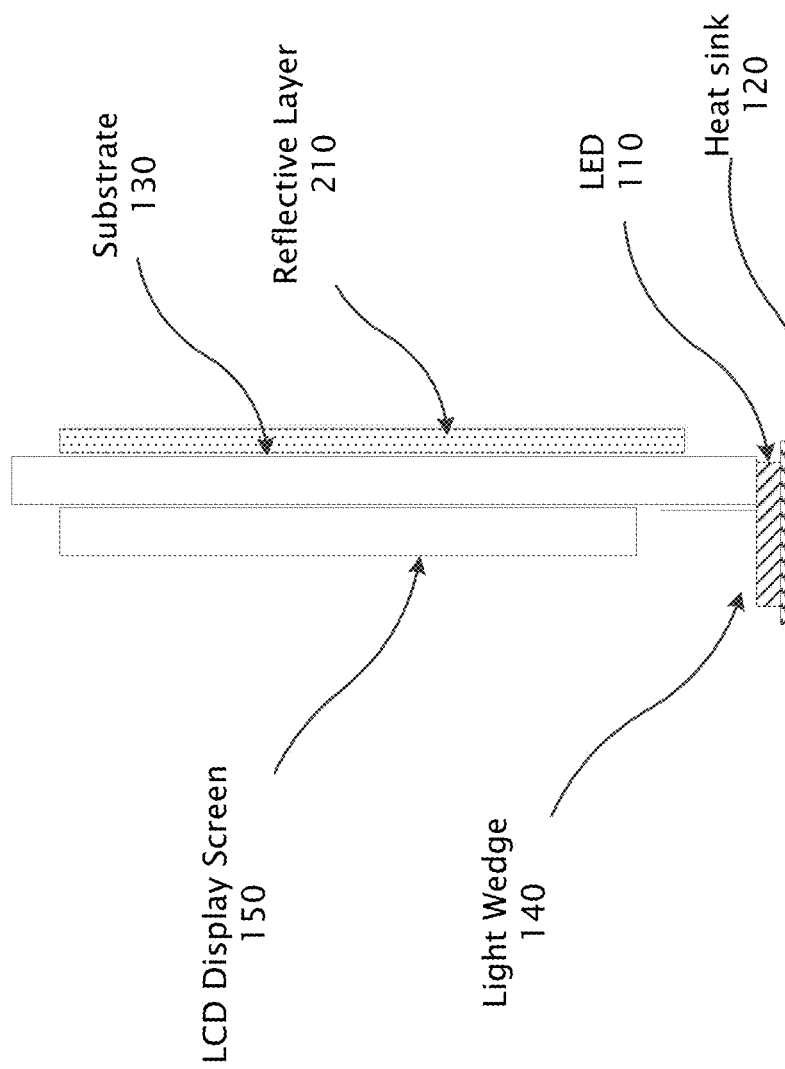
FIG. 3 is an example of a thin front-lit backlight for a LCD display screen with a reflective layer.

FIG. 3 is an example of one embodiment of a thin front-lit backlight for a LCD display screen with a partially reflective light guide, including a reflective layer 210 with a distribution of reflective shapes computed to maximize uniform lighting across the usable substrate.

Backlights direct light toward an LCD display screen 150 for viewing of images projected through the LCD panel. A highly reflective material may be used in the reflective layer 210 of the backlight in order to maximize its uniform brightness and utility as a backlight for applications like high definition LCD televisions, or very large display areas such as advertising in billboard size signage. The pattern for reflective layer 210 may be calculated based upon an image such as that shown in FIG. 2b, based on the natural light distribution of a substrate.

Figure 4:
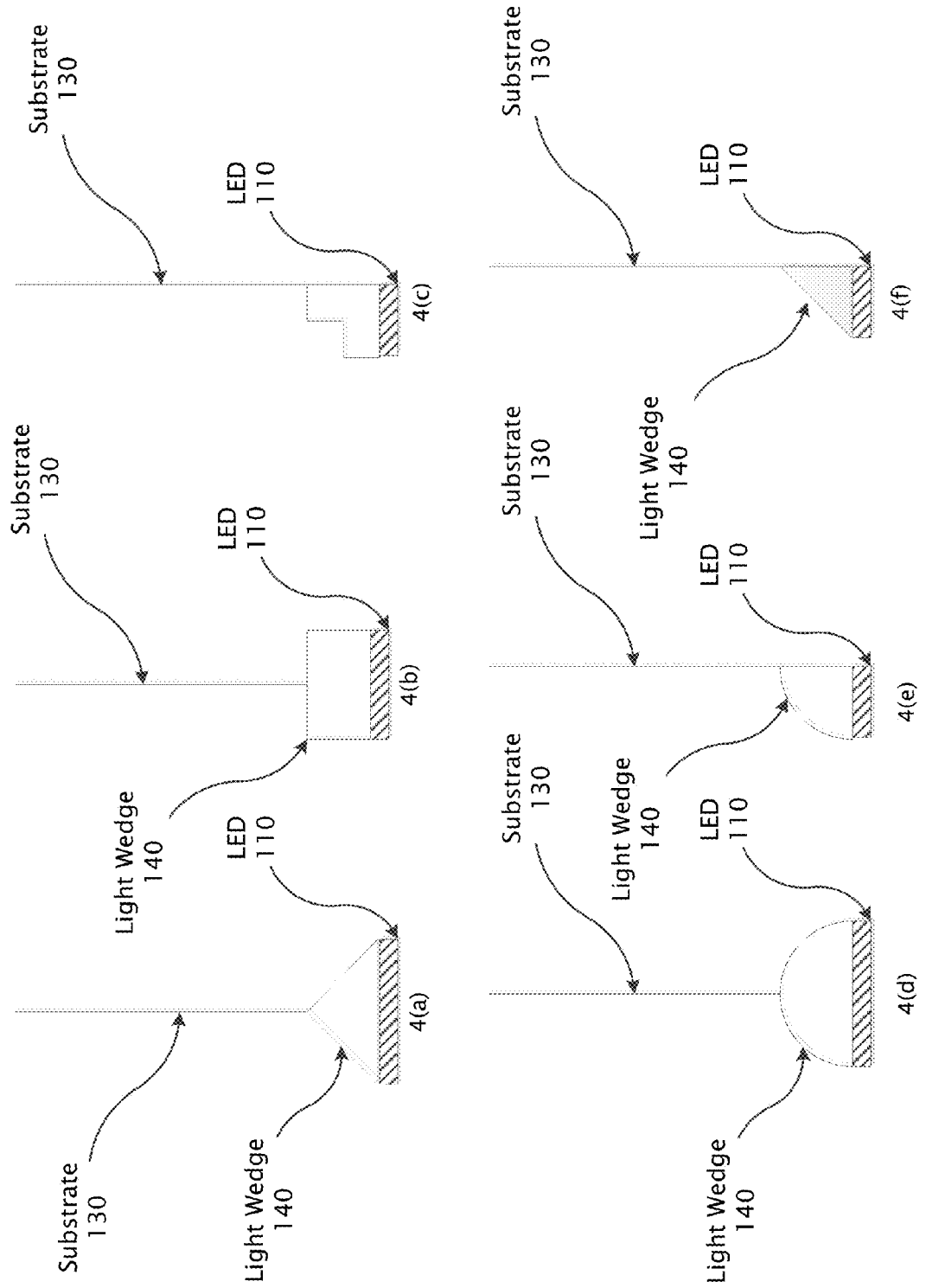
FIG. 4 illustrates several possible embodiments of light wedges.

FIG. 4 illustrates various potential configurations (4(a) through 4(f)) of light wedges which may support a thin front-lit LED Backlight Panel. Other configurations may also be used as light wedges. The light wedge may allow a wider input light source to be channeled into a narrower substrate.

In order to minimize light losses, as much light as possible may be guided and reflected to the output points of the LED backlight assembly by ensuring that all non-output light channels in the substrate have a light barrier in place such as a highly reflective paint, laminate layer, or other light barrier.

This light barrier may also include the areas in and around the LED smd diodes as well as all outer surface areas of the light wedge, with an exception of a wedge output area contacts on substrate.

The invention claimed is:

1. A backlight comprising:
    an optically clear substrate having a front surface, a rear surface, and a thickness between the front surface and the rear surface, the rear surface having a reflective coating to improve uniformity of light reflected through the front surface;
    a light source wider than the thickness of the substrate; and
    a light wedge optically connected to the light source and optically connected to the substrate to guide light from the light source into the substrate.

2. The backlight of claim 1 wherein the rear surface coating comprises reflective paint applied to locations calculated to provide light from the light source evenly over the front surface.

3. The backlight of claim 1 wherein the reflective coating further comprises a reflective sheet attached to the rear surface to prevent light loss through the rear surface.

4. The backlight of claim 2 wherein the rear surface coating further comprises a photo luminescent coating.

5. The backlight of claim 2 wherein the rear surface coating further comprises a fluorescent coating.

6. The backlight of claim 5 wherein the light source comprises an LED emitting light in the ultra-violet range.

7. A method of designing a backlight comprising:
    obtaining an image corresponding to a substrate lit by at least one LED;
    using the image to calculate appropriate light guide disrupters to optimize an even light distribution on a screen-facing side of the substrate.

8. The method of claim 7 wherein the light guide disrupters comprise reflective paint applied to the substrate.

9. The method of claim 7 wherein the light guide disrupters comprise a reflective sheet applied to the substrate.

10. The method of claim 7 wherein the light guide disrupters comprise indentations etched in the substrate.

11. The method of claim 7 wherein the light guide disrupters comprise indentations drilled in the substrate.

12. The method of claim 7 wherein the light guide disrupters comprise indentations molded into the substrate.

13. A backlight comprising:
    an optically clear substrate having a rear surface with light guide disrupters to improve uniformity of light reflected through a front surface; position, and size of the light guide disrupters being calculated based on an image of a similar substrate showing a natural light distribution.

14. The backlight of claim 13 wherein the light guide disrupters comprise reflective paint applied to the substrate.

15. The backlight of claim 13 wherein the light guide disrupters comprise a reflective sheet applied to the substrate.

16. The backlight of claim 13 wherein the light guide disrupters comprise indentations etched in the substrate.

17. The backlight of claim 13 wherein the light guide disrupters comprise indentations drilled in the substrate.

18. The backlight of claim 13 wherein the light guide disrupters comprise indentations molded into the substrate.

19. The backlight of claim 13 further comprising:
    a light source wider than the thickness of the substrate; and
    a light wedge optically connected to the light source and optically connected to the substrate to guide light from the light source into the substrate.

* * * * *